United States Patent

Lukco et al.

[11] Patent Number: 5,273,833
[45] Date of Patent: Dec. 28, 1993

[54] COATED REINFORCEMENTS FOR HIGH TEMPERATURE COMPOSITES AND COMPOSITES MADE THEREFROM

[75] Inventors: D. Lukco, Sagamore Hills; M. A. Tenhover, Solon, both of Ohio

[73] Assignee: The Standard Oil Company, Cleveland, Ohio

[21] Appl. No.: 769,066

[22] Filed: Sep. 26, 1991

Related U.S. Application Data

[63] Continuation of Ser. No. 453,536, Dec. 20, 1989, abandoned.

[51] Int. Cl.$^5$ .......... D02G 3/00; B32B 15/00; C04B 35/52; C04B 35/56
[52] U.S. Cl. .......... 428/368; 428/367; 428/378; 428/379; 428/384; 428/389; 428/404; 428/331; 428/245; 501/88; 501/95
[58] Field of Search .......... 428/242, 244, 367, 368, 428/379, 380, 384, 389, 378; 501/88, 95

[56] References Cited

U.S. PATENT DOCUMENTS

| | | | |
|---|---|---|---|
| 2,699,415 | 1/1955 | Nachtman | 428/373 |
| 3,493,403 | 2/1970 | Tung et al. | 106/52 |
| 3,736,109 | 5/1973 | Darling et al. | 428/656 |
| 3,811,920 | 5/1974 | Galasso et al. | 117/69 |
| 3,871,834 | 3/1975 | Kuniya et al. | 148/437 |
| 4,314,852 | 2/1982 | Brennan et al. | 501/88 |
| 4,315,968 | 2/1982 | Suplinskas et al. | 428/367 |
| 4,324,843 | 4/1982 | Brennan et al. | 428/697 |
| 4,340,636 | 7/1982 | DeBolt et al. | 428/215 |
| 4,376,803 | 3/1983 | Katzman | 428/408 |
| 4,406,669 | 9/1983 | Sarin et al. | 428/698 |
| 4,464,192 | 8/1984 | Layden et al. | 428/367 |

(List continued on next page.)

FOREIGN PATENT DOCUMENTS

| | | |
|---|---|---|
| 0247630 | 2/1987 | European Pat. Off. . |
| 0252046 | 1/1988 | European Pat. Off. . |
| 0326077 | 2/1989 | European Pat. Off. . |
| 0310043 | 4/1989 | European Pat. Off. . |

(List continued on next page.)

OTHER PUBLICATIONS

World Patent Index Latest, Week 8327, Derwent Publications Ltd., London, GB; & JPA-58,091,086, May 30, 1983.

World Patent Index Latest, Week 8940, Derwent Publications Ltd., London, GB; & JP-A-1,212,290, Aug. 25, 1989.

"Thermodynamic Analysis of Chemical Compatability of Several Reinforcement Materials with Aluminide Matrices", Ajay K. Misra, Nasa Lewis Research Center, pp. 193–203.

"Reactive Ion Assisted Deposited of Aluminum Oxynitride Thin Films," Hwangbo et al., Applied Composites, vol. 28, No. 14, pp. 2779–2784.

(List continued on next page.)

Primary Examiner—George F. Lesmes
Assistant Examiner—Terrel Morris
Attorney, Agent, or Firm—Renner, Kenner, Greive, Bobak, Taylor & Weber

[57] ABSTRACT

The subject invention relates to a coated reinforcement material comprising a Si-containing reinforcement having a coating of the general formula:

$$Al_xO_yN_z$$

wherein
  x is up to about 60 atomic % of the coating;
  y is from about 20 atomic % to about 55 atomic % of the coating; and
  z is from about 5 atomic % to about 45 atomic % of the coating, with the proviso that $x+y+z=100$.

The invention further relates to a high strength, high temperature performance composite comprising a Si-containing reinforcement material having a coating comprising aluminum, oxygen and nitrogen, said coated reinforcement material in combination with a matrix material.

28 Claims, 3 Drawing Sheets

U.S. PATENT DOCUMENTS

| | | | |
|---|---|---|---|
| 4,464,475 | 8/1984 | Beall et al. | 501/9 |
| 4,500,602 | 2/1985 | Patten et al. | 428/384 |
| 4,515,860 | 5/1985 | Holzl | 428/375 |
| 4,528,244 | 7/1985 | Winkelbauer et al. | 428/446 |
| 4,585,696 | 4/1986 | Dustmann et al. | 428/375 |
| 4,642,271 | 2/1987 | Rice | 428/698 |
| 4,781,993 | 11/1988 | Bhatt | 428/367 |
| 4,806,428 | 2/1989 | Cooper et al. | 428/403 |
| 4,818,635 | 4/1989 | Ekström et al. | 428/698 |
| 4,847,044 | 7/1989 | Gloosh | 419/8 |
| 4,962,070 | 10/1990 | Sullivan | 428/367 |
| 5,057,465 | 10/1991 | Sakamoto et al. | 428/297 |

FOREIGN PATENT DOCUMENTS

| | | |
|---|---|---|
| 59-156972 | 9/1984 | Japan . |
| 59-205464 | 11/1984 | Japan . |
| 63-277566 | 11/1988 | Japan . |
| 1219572 | 1/1971 | United Kingdom . |
| 2157282A | 10/1985 | United Kingdom . |

OTHER PUBLICATIONS

"Phase Relations and Reaction Sintering of Transparent Cubic Aluminum Oxynitride Spinel," McCauley et al., vol. 62, No. 9–10, pp. 476–479.

"Ceramic Coatings on Ceramics for Improved Oxidation Corrosion Resistance," Davies et al., vol. 36, No. 1–2, pp. 419–432, Dec. 1, 1988.

Petrosck, NASA Conference publications 10039, pp. 8-1 to 8-13.

English translation of Japanese patent 59-156972, 1984, pp. 1–7.

Chemical Abstracts, vol. 99 (1983) No. 14, p. 267.

COATED REINFORCEMENTS FOR HIGH TEMPERATURE COMPOSITES AND COMPOSITES MADE THEREFROM

This is a File Wrapper continuation of co-pending application Ser. No. 07/453,536 filed Dec. 20, 1989, now abandoned.

FIELD OF THE INVENTION

The subject invention relates to reinforcements for high temperature composites that are chemically stable and mechanically stable. In particular, the invention relates to Si-containing reinforcement materials coated with an Al—O—N coating that contributes to the oxidation resistance and high temperature performance of the resulting composite material.

BACKGROUND OF THE INVENTION

Traditionally many commercial applications of high temperature materials have been filled by Ni-,Co-, and Fe-based metal alloys. These materials function well at temperatures below about 800° C., but rapidly lose strength upon exposure to higher temperatures. Thus, in the field of high temperature materials, researchers have focused on the use of heat resistant fibers to reinforce both metallic and ceramic materials. These high strength composites possess a unique combination of high strength, temperature stability, and low density. This allows for their use in materials for aerospace, automotive, and industrial applications.

Silicon-containing materials are known reinforcements for composite materials. These composites potentially possess high toughness levels and good performance characteristics, thereby making them highly suitable for applications which require light-weight structural materials having high elasticity, high strength, shapability, heat stability, electrical conductivity and heat conductivity. These composites are being increasingly investigated for structural applications.

It is known that many fiber-matrix combinations undergo extensive chemical reaction or interdiffusion between the fiber and matrix materials, each of which is likely chosen for the contribution of specific mechanical and/or physical properties to the resulting composite. Such reaction or interdiffusion can lead to serious degradation in strength, toughness, ductility, temperature stability and oxidation resistance. Some changes may result from the difference in the thermal expansion coefficients of the materials.

To compensate for these problems, a variety of coatings have been suggested for reinforcements intended for use in fiber-matrix composites. For example, U.S. Pat. No. 4,340,636 discloses a surface treatment for the formation of a carbon-rich coating on a stoichiometric SiC substrate filament. Similarly, U.S. Pat. No. 4,315,968 discloses coating SiC filaments with a coating of Si-rich SiC.

U.S. Pat. No. 3,811,920 discusses applying a thin layer of TiC to a filamentary substrate having a SiC surface layer. This TiC layer is reported to impart oxidation resistance to the filament and to provide a diffusion barrier between the SiC-surfaced substrate filament and the matrix metals. Boron nitride has also been used as a SiC coating, as in U.S. Pat. No. 4,642,271.

Intermetallic matrix materials have experienced problems similar to those enumerated hereinabove when combined with reinforcements to produce high performance composites. The problems being experienced in this technology field are generally a result of the fact that the matrix material technology and fiber technology have evolved independent of one another, resulting in chemical and mechanical incompatibility of the precursor materials used to produce composites of the type disclosed hereinabove. The foregoing citations demonstrate various attempts within the field to overcome the inherent shortcomings of these composites by using coating materials to provide the needed characteristics or compatibility.

However, composite materials which have employed techniques and coatings such as the foregoing nonetheless remain limited for high temperature application by concerns regarding the thermomechanical stability, thermochemical stability, oxidation resistance and high temperature fatigue resistance encountered in atmospheric conditions at temperatures above 800° C. A specific problem encountered with a number of these coatings relates to the chemical reactivity of the coating with the matrix materials, which manifests itself in the failure of the mechanical and physical performance of the material in high temperature environments.

Accordingly, an object of the subject invention is to provide a coating for Si-containing reinforcements which permits the use of the reinforcement in composite materials for use at high temperatures above 800° C.

Another object of the invention is to provide a coating for Si-containing reinforcements which prevents chemical reaction between the fiber and the matrix.

A further object is to provide a composite which contains coated Si-containing reinforcements which maintains high strength and toughness and resists oxidation at high temperatures.

SUMMARY OF THE INVENTION

The subject invention relates to a coated reinforcement material comprising a Si-containing reinforcement having a coating of the general formula:

$$Al_xO_yN_z$$

wherein
x is up to about 60 atomic % of the coating;
y is from about 20 atomic % to about 55 atomic % of the coating; and
z is from about 5 atomic % to about 45 atomic % of the coating, with the proviso that $x+y+c=100$.

The invention further relates to a high strength, high temperature performance composite comprising a Si-containing reinforcement material having a coating comprising aluminum, oxygen and nitrogen said coated reinforcement material being in combination with a matrix material.

DETAILED DESCRIPTION OF THE INVENTION

The subject invention relates to coated Si-containing reinforcements for use in composite materials. The coatings disclosed herein are of the general formula:

$$Al_xO_yN_z$$

wherein x is present at up to about 60 atomic % of the coating, y is at least about 20 atomic % but not more than about 55 atomic % of the coating, and z is at least about 5 atomic % but not more than about 45 atomic % of the coating, with the proviso that $x+y+z=100$.

The subject coating is of importance due to its compatibility with not only the reinforcement to be coated, but also the matrix material with which the coated reinforcement is combined to form a composite. The coating further effectively inhibits diffusion of Si and C, has excellent oxidation resistance, and forms smooth, adherent coatings on Si-containing reinforcements. Because of these characteristics, the resulting composite is capable of maintaining its strength and high temperature performance, even in the presence of air at temperatures exceeding 800° C. for extended periods of time, thus making the composite highly suitable for demanding industrial applications.

Depending on the deposition procedure used in applying the coating to the reinforcement, oxygen and nitrogen for the subject coating may be derived from N- and O-containing gases, which may be in the elemental state or may be in the compound form, and the Al may be obtained from volatile Al-containing compounds or metallic Al sources. Further, when using a sputter technique, the coating composition may be directly sputtered from an Al—O—N target.

The coating, as described herein, can be deposited by any conventionally known thick or thin film deposition process, examples of which include but are not limited to chemical vapor deposition, rf sputtering, reactive sputtering, reactive ion plating, and reactive evaporation. The coating should be deposited in a layer that is from about 0.5 microns to about 10 microns thick, preferably between about 1.0 micron to about 5.0 microns. Optimally, the reinforcement should be completely coated. Minimal areas that remain uncoated will not, however, adversely affect the composite performance due to the localized nature of the reaction sites which exist in uncoated areas.

The Si-containing reinforcement may be any of the following: $Si_3N_4$; SiAlON; or SiC, all of which are readily available commercial items such as Sigma Fibers from British Petroleum, SCS-6 from Textron, and Nicalon Fibers from Dow Corning. This reinforcement material may be in the form of continuous fibers, chopped fibers, whiskers, platelets, particles or powder, or any other useful form.

Figure 1:
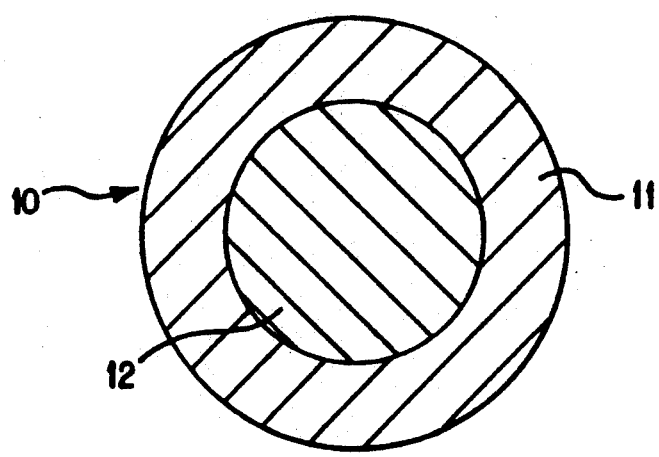
FIG. 1 represents a cross-section of a coated Si-containing reinforcement fiber.

FIG. 1 is a cross-section of a coated reinforcement 10 wherein a Si-containing reinforcement fiber 12 has been coated with an Al—O—N-type coating 11 as described herein.

Figure 2:
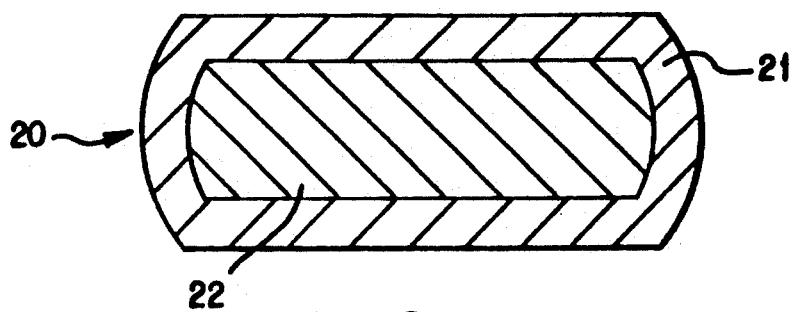
FIG. 2 represents a cross-section of a coated Si-containing reinforcement platelet.

FIG. 2 is a cross-section of a coated reinforcement 20 wherein a Si-containing reinforcement in the form of a platelet 22 has been coated with an Al—O—N-type coating 21 as set forth herein.

The reinforcement material may further be amorphous, polycrystalline or single crystal in nature. An appropriate reinforcement for a given application may be selected from those specified above depending on the optimum characteristics to be attained in the resulting composite, such as strength-per-weight, smoothness-per-weight, high temperature performance, or toughness, among others.

It may be advantageous, depending on the end use of the material, to form the reinforcement by depositing a Si-containing material listed above on a core material which possesses a very high melting point prior to deposition of the subject coating. Such core material would typically be carbon or a refractory metal, such as W, Mo or Ti, among others, each of which is commercially available, such as those available from Stackpole Fibers Company and Alfa Inorganics.

Figure 3:
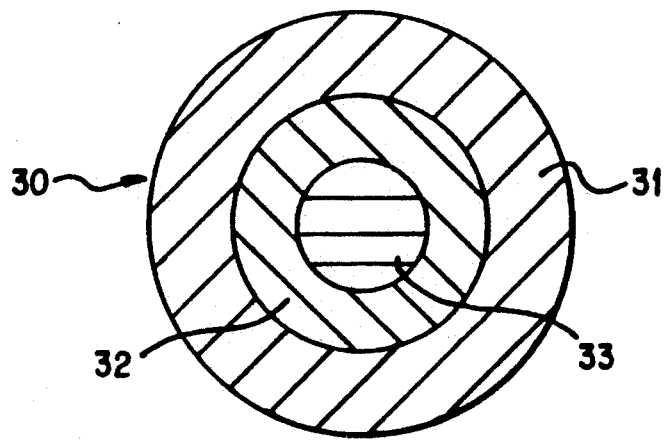
FIG. 3 represents a cross-section of a coated Si-containing reinforcement which was first deposited on a carbon core.

FIG. 3 is a cross-section of a coated reinforcement 30, having a core 33, coated with a Si-containing layer 32, which is then coated with an Al—O—N-type coating 31 of the type disclosed herein.

Prior to coating any of the reinforcements described above, the reinforcement may be pretreated to enhance the adherence of the coating to the reinforcement and the smoothness of the reinforcement-coating interface. Such pretreatment processes may include chemical etching, ion etching, flame polishing and mechanical polishing, among others, which may be accomplished by conventional pretreatment techniques.

The coated reinforcement may be fabricated into various shapes or may be woven or otherwise structured prior to combination with the matrix material. This fabrication may also be accomplished according to conventional techniques.

For use in complex-shaped components, it is desirable to fabricate the reinforcements into a shape prior to the application of the coating. This can be accomplished for example, by weaving continuous fibers into a three-dimensional shape, dispersing discontinuous fibers or platelets into a liquid like water and allowing them to settle while removing the liquid, or loosely packing a reinforcement like a powder and sintering to obtain a porous structure. However, the fabricated shape is prepared, it is important that the shape not be fully dense and preferably that it be about 10–50% dense with no closed porosity. Coating of the reinforcements in the fabricated shape is preferrably accomplished by chemical vapor deposition.

Suitable matrix materials into which reinforcements coated according to this disclosure are to be disposed include ceramic, glass and intermetallic matrix composites. Generally, matrix materials include: reaction-bonded SiC; intermetallic alloys containing at least two of Ti, Al, Nb, Ta, Cr, V, and Si; glass ceramics containing at least two of Li, Al, Si, O, Ca, Sr and Mg; and metal alloys containing at least two of Al, Si, Mg, Ni, Li and Mg. Table I below lists a number of representative matrix materials suitable for use in the subject invention, though the list is not intended to be exhaustive of all possible matrix materials.

TABLE I

| Potential matrix materials |
|---|
| Intermetallics: |

TABLE I-continued

Potential matrix materials

| | | |
|---|---|---|
| Ti$_3$Al | TiAl | TiAl$_3$ |
| Nb$_3$Al | NbAl | NbAl$_3$ |
| Zr$_3$Al | ZrAl | ZrAl$_3$ |
| Ta$_3$Al | TaAl | TaAl$_3$ |
| Ni$_3$Al | NiAl | Ni$_3$AlB$_{0.01}$ |
| Fe$_3$Al | FeAl | Fe$_3$AlB$_{0.01}$ |
| Ti$_5$Si$_3$ | Zr$_5$Si$_3$ | Al$_{67}$Ni$_8$Ti$_{25}$ |
| Ti$_{44}$Nb$_{11}$Al$_{45}$ | Ti$_{65}$V$_{10}$Al$_{25}$ | Ni$_2$AlTi |
| TiTaAl$_{0.8}$Cr$_{0.1}$V$_{0.1}$ | TiNbAl$_{0.7}$V$_{0.1}$Si$_{0.3}$ | MoSi$_2$ |
| TiTaAl$_2$ | | |

Glass-Ceramics

| | | |
|---|---|---|
| SiO$_2$ | Al$_2$O$_3$ | MgO |
| SiO$_2 \cdot$ Al$_2$O$_3$ | CaO $\cdot$ 3SiO$_2$ | MgO $\cdot$ SiO$_2 \cdot$ 2Al$_2$O$_3$ |
| Li$_2$O $\cdot$ Al$_2$O$_3 \cdot$ 2SiO$_2$ | Li$_2$O $\cdot$ Al$_2$O$_3 \cdot$ 4SiO$_2$ | Li$_2$O $\cdot$ Al$_2$O$_3 \cdot$ 8SiO$_2$ |
| BaO $\cdot$ 2SiO$_2 \cdot$ 2Al$_2$O$_3$ | CaO $\cdot$ 2SiO$_2 \cdot$ 2Al$_2$O$_3$ | MgO $\cdot$ CaO $\cdot$ 2SiO$_2 \cdot$ 4Al$_2$O$_3$ |
| 4BaO $\cdot$ 8SiO$_2 \cdot$ 8Al$_2$O$_3 \cdot$ TiO$_2$ | | |

For intermetallics, especially interesting are the Titanium-Aluminide alloys described in a JOM article from July, 1989, pages 24–30 by Young-Won Kim entitled, "Intermetallic Alloys based on Gamma Titanium Aluminide", and also the Silicide alloys described in JOM November, 1989 pages 52–55 by Peter J. Meschter and Daniel S. Schwartz entitled "Silicide-Matrix materials for High Temperature Applications." Preferred matrix materials include intermetallic alloys such as Ti$_3$Al, TiAl, Ti$_{44}$Nb$_{11}$Al$_{45}$, TiTaAl$_2$, Ni$_3$Al, FeAl and NbAl$_3$.

Intermetallic matrix materials are alloys of Al with at least one of the early transition metals, i.e. Ti, Ta and Nb. When the matrix material is intermetallic, the coating specified above may further contain a component M such that the general formula becomes:

$$Al_xO_yN_zM_a$$

wherein M is selected from the group consisting of Ti, Nb, Ta and Zr, and wherein x is present as up to at least about 60 atomic % of the coating, y is at least about 20 atomic % but not more than about 55 atomic % of the coating, z is at least 5 atomic % but not more than 45 atomic % of the coating, and a is up to about 25 atomic % of the coating, such that $x+y+z+a=100$.

Matrix materials may be obtained commercially in the form of powders or foils, such as TiAl powder or foil, or may be formulated by arc melting, casting, hot pressing or other known techniques.

When preparing coated reinforcements by sputtering, such as Al$_{44}$O$_{18}$N$_{38}$ on SiC, the process is preferably carried out using an Al metal sputter target in the presence of a mixture of nitrogen and oxygen. The ratio of N/O should be greater than about 100/1. Optionally, an inert gas, such as Argon, may also be present. The total pressure of the sputter gas should be less than about 50 motor. The temperature during the deposition process may be anywhere from room temperature to about 1000° C. The deposition rate may vary from 1 to about 1000 angstroms/second. The resulting coating should be between about 0.5 microns and about 10 microns thick, and have a density of at least about 80% and preferably greater than 95%.

The efficiency of the diffusion barrier properties of the coating are related to the density of the coating, i.e. density in excess of about 80% corresponds to minimal or no diffusion of elements from the reinforcement to the matrix.

A similar coated reinforcement can be prepared by chemical vapor deposition by using Al-halogen compounds, Al-organometallic compounds or metallic Al, in the presence of a combination of N$_2$ and O$_2$. The temperature range for such a process is between about 400° C. and about 1000° C. Use of an rf or dc plasma to aid in the deposition process may be necessary.

The coated reinforcement may then be combined with a selected matrix material by any of a number of methods and techniques known to those skilled in the art, such as hot pressing or melt infiltration, among others.

Composites, such as those containing Al—O—N coated SiC fibers, are operable in an environment wherein the temperature is up to about 0.9 of the melting point of the matrix material. Further, such composites are operable at pressures from 0 to about 100 atms., and can be used in air, vacuum or inert atmospheres, such as Ar, N$_2$ or He.

EXAMPLES

The following experimentation was conducted to demonstrate the stability of coated Si-containing reinforcements at elevated temperatures.

The samples prepared and tested in the following examples were of the structure:

matrix/coating/substrate

Substrate, for purposes of these examples, refers to a finely polished bar of sintered SiC (Alpha SiC sintered with boron sintering aid) which was used as a base upon which to build the composite structure. The coating and matrix layers were applied to the substrate using magnetron sputtering and a commercial S-gun arrangement. A typical procedure was to mount the polished SiC substrate in a cryopumped (base pressure $2 \times 10^{-7}$ torr) vacuum chamber on a sample holder that rotated about the sputter gun to insure an even coverage of the coating. One S-gun was used to deposit the coating layer (0.5 to 2.0 microns) while the matrix (1.0 to 2.0 microns) could be deposited using the other S-gun, thus avoiding the need to break the vacuum between the deposition of the two layers. The sputtering was performed in an argon atmosphere, at a pressure of 1.5 mtorr.

The foregoing process produced smooth, dense, adherent coatings. The thickness of the coating and matrix were determined by a TM-100 thickness monitor in the vacuum chamber.

Following deposition, the samples were tested by exposure to two types of heat treatments. The first was a vacuum anneal for 4–12 hours at 1000° C. This was performed in a high vacuum chamber (cryopump $5 \times 10^{-7}$ torr) using a temperature controlled resistance heated Radak furnace.

The second heat treatment was at a temperature of 1000° C. for 6-12 hours in air in a resistance heated furnace. In this case the samples were loaded into an open ended fused silica tube in which air was gently flowed at low rates over the sample.

The following table, Table II, reports the extent of reaction for various samples prepared as described hereinabove. As can be seen, those samples in which the SiC reinforcement was coated with an Al—O—N coating according to the subject invention (G, H and I), experienced slight or no reaction compared to the remaining samples which did not contain Al—O—N coated SiC reinforcements (A-F).

TABLE II

| Sample | Matrix | Coating | Result |
|---|---|---|---|
| A | $Ti_{56}Al_{44}$ | None | Extensive reaction[a] |
| B | $Ti_{56}Al_{44}$ | $TiB_2$ | Extensive reaction[a] |
| C | $Ti_{56}Al_{44}$ | BN | Reacted[b] |
| D | $Ti_{56}Al_{44}$ | Si | Reacted[b] |
| E | $Ti_{56}Al_{44}$ | SiC | Reacted[b] |
| F | $Ti_{56}Al_{44}$ | TiC | Extensive Reaction[a] |
| G | $Ni_3Al$ | $Al_{44}O_{18}N_{38}$ | Stable[b] |
| H | $Ti_{56}Al_{44}$ | $Al_{44}O_{18}N_{38}$ (thin) | Stable interface; slight[a] Si diffusion |
| I | $Ti_{56}Al_{44}$ | $Al_{44}O_{18}N_{38}$ (0.6µ) | Stable interface; no Si[a] diffusion | a = air
b = vacuum

X-ray Photoelectron Spectroscopy (XPS) and SIMS were used to determine the extent of reaction between the reinforcement and the matrix.

The XPS spectra were acquired on a PHI 5400 XPS instrument using 300 watt Mg $K_\alpha$ x-rays, 1 mm diameter spot size, and 35.75 pass energy. Survey spectra were taken so that all surface components could be identified and higher resolution narrow region scans could then be obtained. The pressure in the main analysis chamber was in the $10^{-10}$ torr.

Depth profiles of the various samples were acquired with a Cameca IMBS-3F Secondary Ion Mass Spectrometer (SIMS). The data was taken using a 200 nA, 14.5 kV, O—, primary beam analyzing for positive secondary ions. The primary beam was rastered over a 200 micron square area of the sample and secondary ions were collected from a circular area 8 microns in diameter in the center of the rastered area. This type of collection scheme eliminates crater edge effects. The resulting plot is one of intensity (counts/sec) vs. depth, intensity being plotted on a log scale. The depth scales of the plots were obtained by measuring the depth of the crater formed in analysis with a profilometer. In interpreting the SIMS depth profile plots it must be remembered that SIMS ion yields can vary drastically from one element to the next. For example, SiC although stoichiometrically is 1:1, in the SIMS analysis the Si signal is ca. 150,000 counts/second while the carbon signal is ca. 1000 counts/second. The profiles illustrate the important changes in elemental compositions as monitored through the various layers of the sample.

Figure 4:
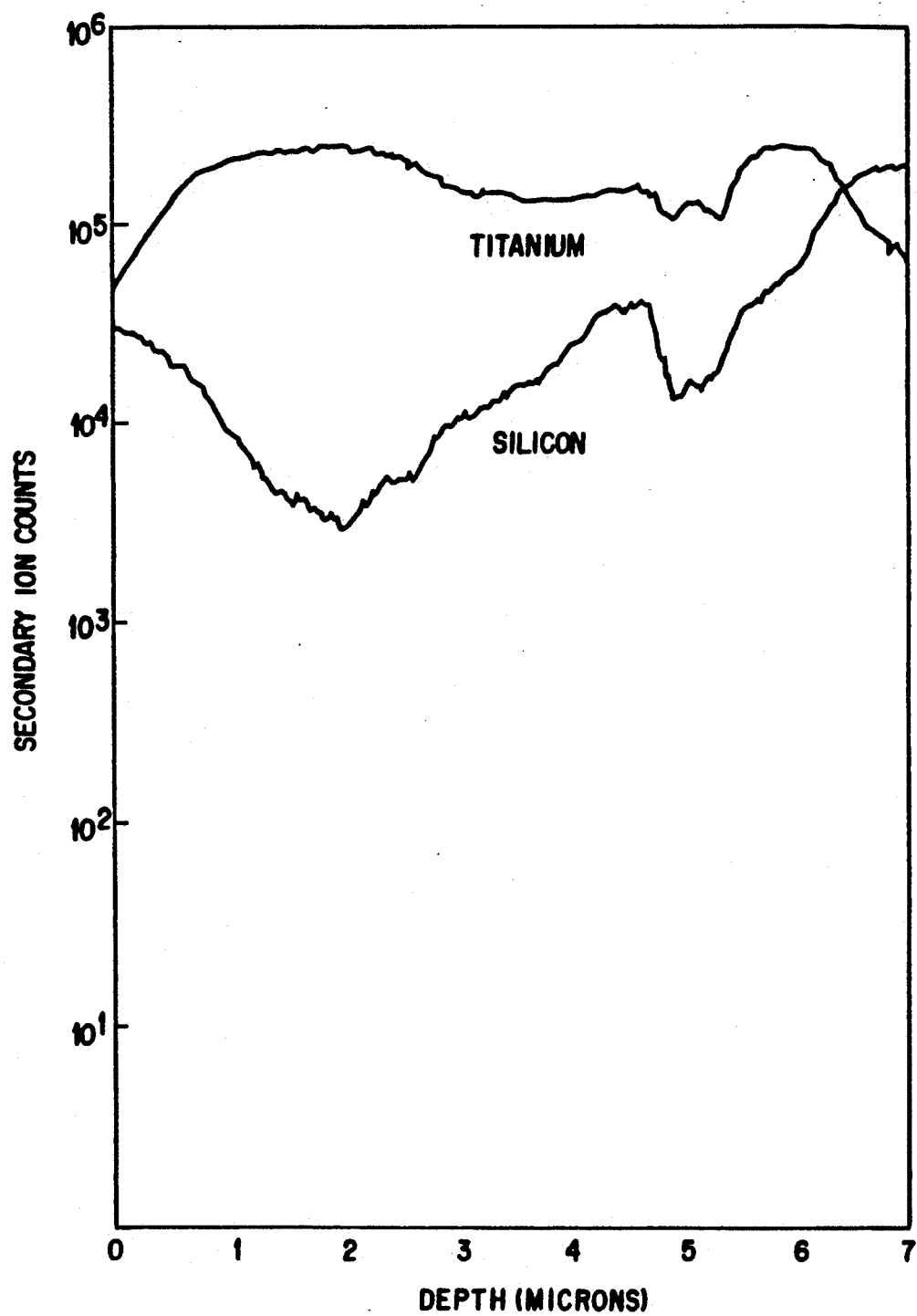
FIG. 4 is a SIMS depth profile of a SiC reinforcement coated with $TiB_2$ in a $Ti_{56}Al_{44}$ matrix following 1000° C. heat treatment.

FIG. 4 is a SIMS depth profile, measured as just described, for sample B. The profile starts on the surface of the sample (depth=0 microns) and continues through the sample until the SiC reinforcement is reached. It is observed in FIG. 4 that Ti has diffused from the $Ti_{56}Al_{44}$ matrix layer through the $TiB_2$ coating on the SiC reinforcement. Likewise, Si has diffused from the SiC reinforcement through the $TiB_2$ layer and has reacted with the $Ti_{56}Al_{44}$ layer. The properties of both the matrix, which has experienced increased brittleness, and the reinforcement, which has experienced a loss of strength, have been seriously degraded by these reactions.

Figure 5:
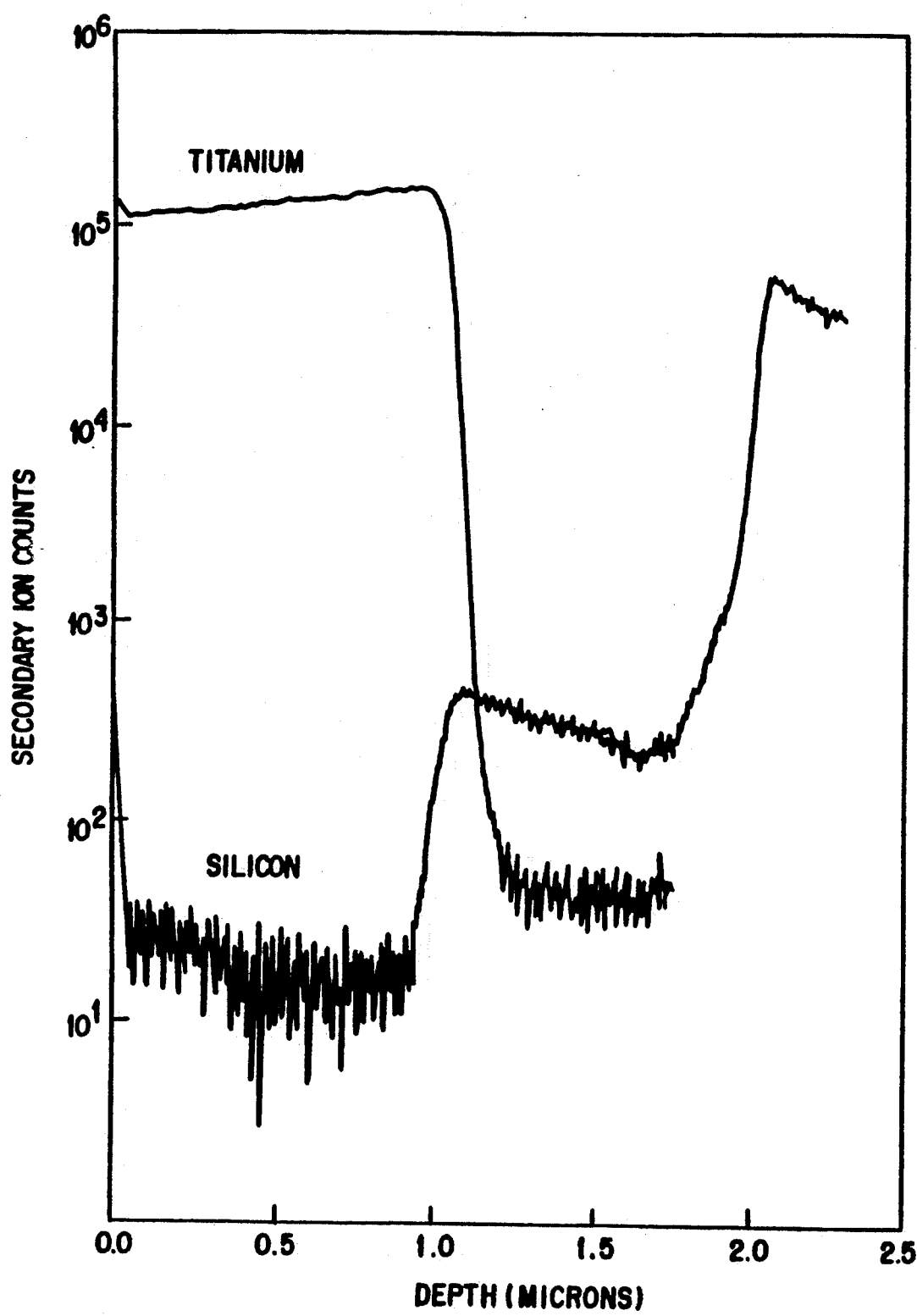
FIG. 5 is a SIMS depth profile of a SiC reinforcement coated with $Al_{44}O_{18}N_{38}$ in a $Ti_{56}Al_{44}$ matrix following 1000° C. heat treatment.

FIG. 5 is a SIMS depth profile, measured as specified above, for Sample I. In this profile it is observed that the well-defined layers of the sample have been preserved despite the heat treatment, 1000° C. for 4 hours in air, and there is essentially no diffusion of either Si or Ti within the sample. This stable interface behavior enhances the properties of the sample composite as a whole.

To test the stability of the various coatings described above, samples were prepared consisting of matrix, coating and reinforcement. The matrix was $Ti_{56}Al_{44}$ and the reinforcement was SiC. The various coatings are described in the Table II. The samples were heat treated in air. SIMS depth profiles were taken of the samples with and without the heat treatment. Of primary importance to the question of stability of the matrix/coating/Si-containing reinforcement is the diffusion of silicon into the coating. A measure of the effectiveness of the coating is the amount of silicon observed in the middle of the coating layer following the heat treatment. Table III gives the ratio of the Si in the middle of the coating after the heat treatment to the amount of Si originally present in the middle of the coating. Ratios significantly higher than 1.0 indicate massive diffusion of Si and failure of the coating to protect the reinforcement from degradation. Ratios near 1.0 indicate excellent performance, minimal or no Si diffusion, and correspond to stable composite properties. Only the sample with the Al—O—N coating on the reinforcement was found to perform as an effective diffusion barrier in both the air and vacuum high temperature testing. In Table III, the sample letter designations correspond to those of Table II.

TABLE III

| Sample | Coating | Si ratio at ½ coating thickness |
|---|---|---|
| 1 (A) | None | 160/1 |
| 2 (B) | $TiB_2$ | 120/1 |
| 3 (F) | TiC | 100/1 |
| 4 (H, I) | $Al_{44}O_{18}N_{38}$ | 1/1 |

The foregoing examples have been presented to demonstrate the oxidation and corrosion resistance of Si-containing reinforcements coated with an Al—O—N-type coating as set forth herein in air or vacuum at high temperatures. These examples are not intended to limit the subject invention, the breadth of which is defined by the specification and the claims appended hereto, but are presented matter to aid those skilled in the art in clearly understanding the invention defined herein.

What we claim is:

1. A coated reinforcement material for incorporation into a matrix, comprising:
   a discrete, individually coated Si-containing reinforcement selected from the group consisting of continuous fibers, chopped fibers, whiskers, platelets, particles and powder; and
   wherein said Si-containing reinforcement is coated with a thin outer coating of from about 0.5 microns to about 10 microns thick having the general formula:

$Al_xO_yN_z$ wherein x is greater than zero to about 60 atomic % of the coating; y is from 18 atomic % to about 55 atomic % of the coating; z is from about 5 atomic % to about 45 atomic % of the coating; and x+y+z=100.

2. The coated reinforcement material as in claim 1 wherein said coating is deposited by a thick film deposition process.

3. The coated reinforcement material as in claim 1 wherein said coating is deposited by a thin film deposition process.

4. The coated reinforcement material as in claim 1 wherein said coating is from about 1.0 microns to about 5.0 microns thick.

5. The coated reinforcement material as in claim 1 wherein said Si-containing reinforcement is selected from the group consisting of $Si_3N_4$, SiAlON, and SiC.

6. The coated reinforcement material as in claim 1 wherein said Si-containing reinforcement is amorphous.

7. The coated reinforcement material as in claim 1 wherein said Si-containing reinforcement is polycrystalline.

8. The coated reinforcement material as in claim 1 wherein said Si-containing reinforcement is a single crystal.

9. The coated reinforcement material as in claim 1 wherein said Si-containing reinforcement is pretreated prior to the addition of said coating to said Si-containing reinforcement.

10. The coated reinforcement material as in claim 1 wherein said coated reinforcement material is fabricated into a shape.

11. The coated reinforcement material as in claim 1 wherein said coated reinforcement material is woven.

12. The coated reinforcement material as in claim 1 wherein said Si-containing reinforcement is deposited on a core material.

13. The coated reinforcement material as in claim 14 wherein said core material is selected from the group consisting of W, Mo and Ti.

14. A high strength, high temperature performance composite comprising:
a discrete, individually coated Si-containing reinforcement material comprising a Si-containing reinforcement selected from the group consisting of continuous fibers, chopped fibers, whiskers, platelets, particles and powder; and, wherein said Si-containing reinforcement is coated with a thin outer coating of from about 0.5 microns to about 10 microns thick having the general formula:

$Al_xO_yN_z$ wherein x is greater than zero to about 60 atomic % of the coating; y is from 18 atomic % to about 55 atomic % of the coating; z is from about 5 atomic % to about 45 atomic % of the coating; and x+y+z=100; and a matrix material into which said coated reinforcement material is incorporated.

15. The composite as in claim 14 wherein said matrix material is selected from the group consisting of ceramic, glass and intermetallic.

16. The composite as in claim 14 wherein said matrix material is selected from the group consisting of reaction-bonded SiC, intermetallic alloys, glass ceramics and metal alloys.

17. The composite as in claim 14 wherein said matrix material is selected from the group consisting of $Ti_3Al$, TiAl, $Ti_{44}Nb_{11}Al_{45}$, $TiTaAl_2$, $Ni_3Al$, FeAl and $NbAl_3$.

18. The composite as in claim 14 wherein said matrix material is intermetallic and said coating further contains an element $M_a$, such that M is selected from the group consisting of Ti, Nb, Ta and Zr, and a is up to about 25 atomic %, with the proviso that x+y+z+a=100.

19. The composite as in claim 14 wherein said coating has a density of greater than 80%.

20. The composite as in claim 14 wherein said coating has a density of greater than 95%.

21. The composite as in claim 14 wherein said coating is deposited by a thick film deposition process.

22. The composite as in claim 14 wherein said coating is deposited by a thin film deposition process.

23. The composite as in claim 14 wherein said coating is from about 1.0 microns to about 5.0 microns thick.

24. The composite as in claim 14 wherein said Si-containing reinforcement is selected from the group consisting of $Si_3N_4$, SiAlON, and SiC.

25. The composite as in claim 14 wherein said reinforcement material is amorphous.

26. The composite as in claim 14 wherein said reinforcement material is polycrystalline.

27. The composite as in claim 14 wherein said reinforcement material is a single crystal.

28. The composite as in claim 14 wherein said reinforcement material is pretreated prior to the deposition of said coating.

* * * * *